United States Patent [19]
Nease

[11] Patent Number: 5,785,009
[45] Date of Patent: Jul. 28, 1998

[54] ANIMAL EYE PROTECTING SYSTEM

[76] Inventor: Wayne Nease, 1665 Spray Way, Newport, Tenn. 37821

[21] Appl. No.: 779,849

[22] Filed: Jan. 7, 1997

[51] Int. Cl.$^6$ .............................. A01K 29/00; B68C 5/00
[52] U.S. Cl. .................................. 119/850; 54/80.2
[58] Field of Search .......................... 119/850, 836; 54/80.2; D3/144; 351/44; 2/13, 426; D16/303, 311, 312, 325, 326, 329

[56] References Cited

U.S. PATENT DOCUMENTS

| | | | |
|---|---|---|---|
| 903,108 | 11/1908 | Rogers | 119/850 |
| 1,123,018 | 12/1914 | Schubert | 119/836 |
| 1,550,547 | 8/1925 | Jurey | 119/836 |
| 3,834,121 | 9/1974 | Mahoney | 54/80.2 |
| 4,040,239 | 8/1977 | Powell | 119/850 X |
| 4,178,742 | 12/1979 | Longfellow | 54/80.2 |
| 4,756,145 | 7/1988 | Pelling | 119/850 |

Primary Examiner—Michael J. Carone
Assistant Examiner—Yvonne R. Abbott

[57] ABSTRACT

A new Animal Eye Protecting System for protecting an animal's eyes after medical treatment thereby expediting recovery while simultaneously preventing infections within the eyes. The inventive device includes a shield having a hexagonal cross-section, an end member secured to an end of the shield having a cutout for engaging a bridge of the animal's nose, an adjustable chin strap, a first neck strap, and a second neck strap secured to the shield. A plurality of snap-buttons are secured to the shield and the straps for allowing adjustment of the present invention to various sizes of animals. The shield may be tinted thereby reducing the amount of light reaching the animal's sensitive eyes. When the shield is attached to the animal's head and neck, the animal is unable to scratch their eyes.

4 Claims, 2 Drawing Sheets

ANIMAL EYE PROTECTING SYSTEM

BACKGROUND OF THE INVENTION

1. Field of the Invention

The present invention relates to Animal Protective Devices and more particularly pertains to a new Animal Eye Protecting System for protecting an animal's eyes after medical treatment thereby expediting recovery while simultaneously preventing infections within the eyes.

2. Description of the Prior Art

The use of Animal Protective Devices is known in the prior art. More specifically, Animal Protective Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Animal Protective Devices include U.S. Pat. Nos. 4,178,742; 4,404,789; 4,581,877; U.S. Design Patent 346,613; U.S. Pat. Nos. 5,031,388 and 3,964,241.

While these devices fulfill their respective, particular objectives and requirements, the aforementioned patents do not disclose a new Animal Eye Protecting System. The inventive device includes a shield having a hexagonal cross-section, an end member secured to an end of the shield having a cutout for engaging a bridge of the animal's nose, an adjustable chin strap, a first neck strap, and a second neck strap secured to the shield.

In these respects, the Animal Eye Protecting System according to the present invention substantially departs from the conventional concepts and designs of the prior art, and in so doing provides an apparatus primarily developed for the purpose of protecting an animal's eyes after medical treatment thereby expediting recovery while simultaneously preventing infections within the eyes.

SUMMARY OF THE INVENTION

In view of the foregoing disadvantages inherent in the known types of Animal Protective Devices now present in the prior art, the present invention provides a new Animal Eye Protecting System construction wherein the same can be utilized for protecting an animal's eyes after medical treatment thereby expediting recovery while simultaneously preventing infections within the eyes.

The general purpose of the present invention, which will be described subsequently in greater detail, is to provide a new Animal Eye Protecting System apparatus and method which has many of the advantages of the Animal Protective Devices mentioned heretofore and many novel features that result in a new Animal Eye Protecting System which is not anticipated, rendered obvious, suggested, or even implied by any of the prior art Animal Protective Devices, either alone or in any combination thereof.

To attain this, the present invention generally comprises a shield having a hexagonal cross-section, an end member secured to an end of the shield having a cutout for engaging a bridge of the animal's nose, an adjustable chin strap, a first neck strap, and a second neck strap secured to the shield.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Animal Eye Protecting System apparatus and method which has many of the advantages of the Animal Protective Devices mentioned heretofore and many novel features that result in a new Animal Eye Protecting System which is not anticipated, rendered obvious, suggested, or even implied by any of the prior art Animal Protective Devices, either alone or in any combination thereof It is another object of the present invention to provide a new Animal Eye Protecting System which may be easily and efficiently manufactured and marketed.

It is a further object of the present invention to provide a new Animal Eye Protecting System which is of a durable and reliable construction.

An even further object of the present invention is to provide a new Animal Eye Protecting System which is susceptible of a low cost of manufacture with regard to both materials and labor, and which accordingly is then susceptible of low prices of sale to the consuming public, thereby making such Animal Eye Protecting System economically available to the buying public.

Still yet another object of the present invention is to provide a new Animal Eye Protecting System which provides in the apparatuses and methods of the prior art some of the advantages thereof, while simultaneously overcoming some of the disadvantages normally associated therewith.

Still another object of the present invention is to provide a new Animal Eye Protecting System for protecting an animal's eyes after medical treatment thereby expediting recovery while simultaneously preventing infections within the eyes.

Yet another object of the present invention is to provide a new Animal Eye Protecting System which includes a shield having a hexagonal cross-section, an end member secured to an end of the shield having a cutout for engaging a bridge of the animal's nose, an adjustable chin strap, a first neck strap, and a second neck strap secured to the shield.

Still yet another object of the present invention is to provide a new Animal Eye Protecting System that does not

3 hinder normal the normal everyday activities of the animal such as eating, drinking, seeing and sleeping.

Even still another object of the present invention is to provide a new Animal Eye Protecting System that is extremely difficult for the animal to remove.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENT

Figure 1:
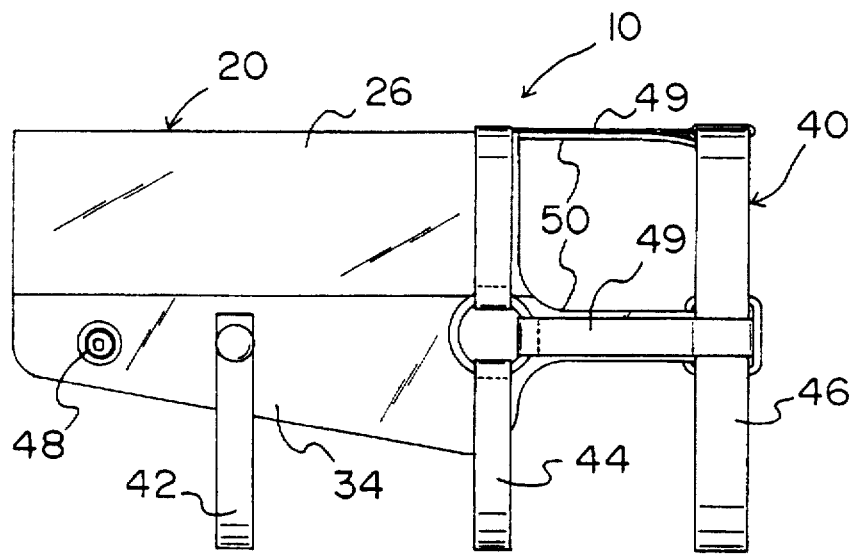
FIG. 1 is a side view of a new Animal Eye Protecting System according to the present invention.

With reference now to the drawings, and in particular to FIGS. 1 through 4 thereof, a new Animal Eye Protecting System embodying the principles and concepts of the present invention and generally designated by the reference numeral 10 will be described.

More specifically, it will be noted that the Animal Eye Protecting System 10 comprises a shield 20 formed to cover a pair of eyes of an animal, and an adjustable securing means 40 attached to the shield 20 for securing the shield 20 to a head of the animal. The shield 20 is preferably constructed from a transparent plastic or in an alternative embodiment from a tinted plastic for reducing the amount of light reaching the animal's eyes.

Figure 2:
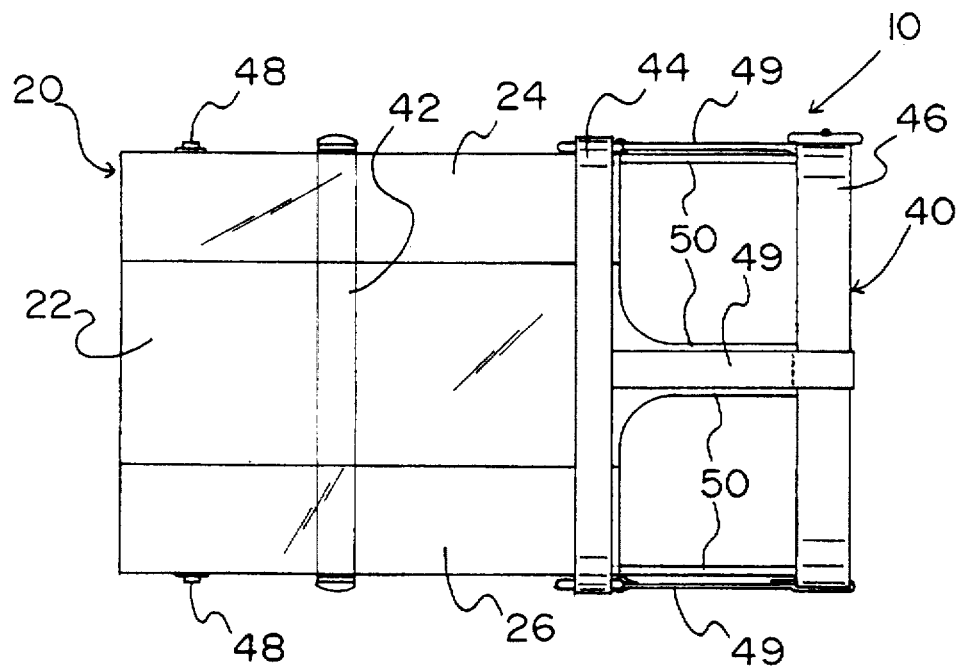
FIG. 2 is a top view of the present invention.
Figure 3:
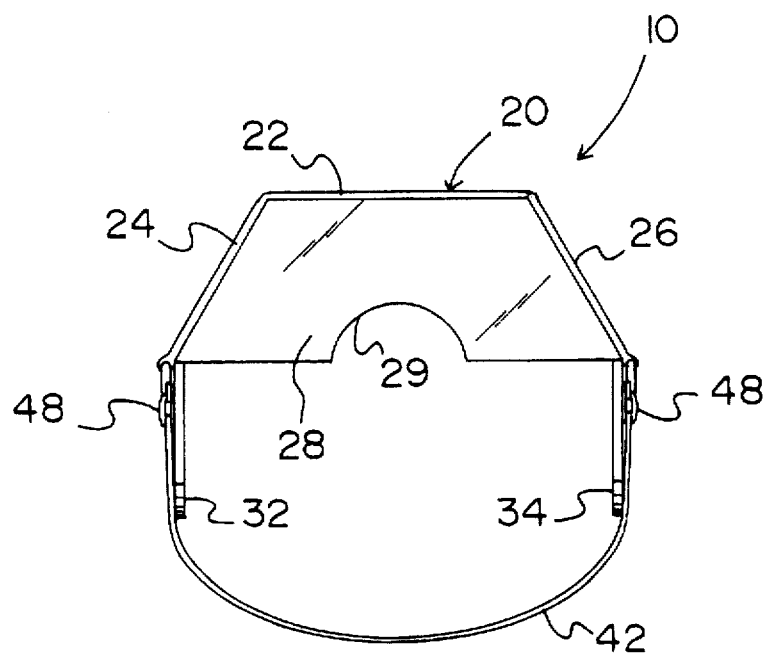
FIG. 3 is a front view of the present invention.
Figure 4:
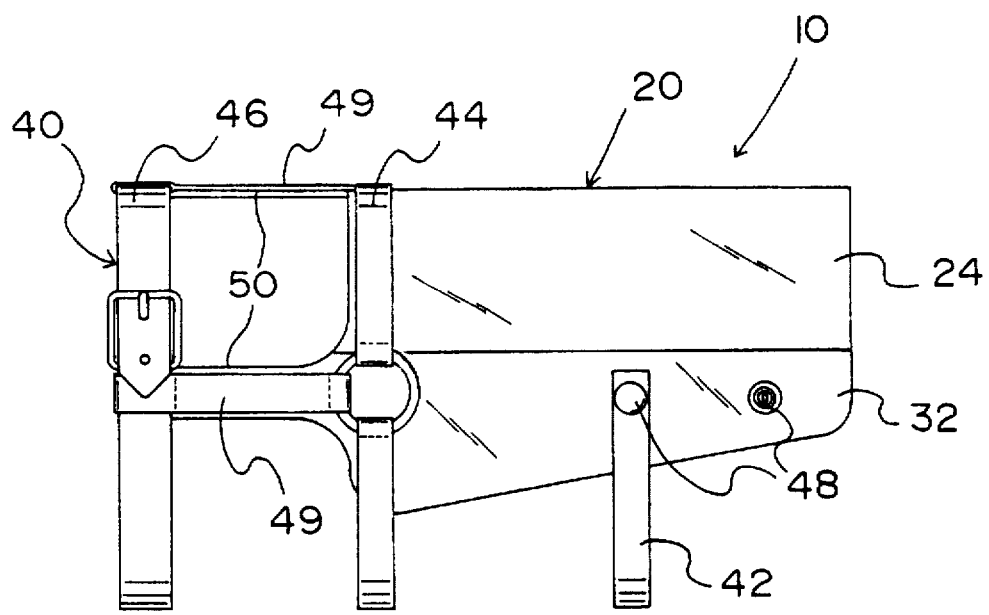
FIG. 4 is a side view of the present invention.

As shown in FIGS. 2 and 3 of the drawings the shield 20 comprises an elongated member 22 having a front end and a rear end. A left member 24 is secured substantially orthogonally to a left edge of the elongated member 22 adjacent the front end extending a finite distance towards the rear end as shown in FIGS. 2 through 4 of the drawings. A right member 26 is secured substantially orthogonally to a right edge of the elongated member 22 adjacent the front end extending a finite distance towards the rear end as shown in FIGS. 1 and 3 of the drawings. The left member 24 and the right member 26 preferably slant downwardly away from each other thereby forming to a shape of the animal's head as best shown in FIG. 3 of the drawings. The shield 20 also has an end member 28 secured traversely to the first end of the elongated member 22 and secured traversely to the left member 24 and the right member 26 for engaging a bridge of the animal's nose as best shown in FIG. 3 of the drawings. The end member 28 includes a cutout 29 concentrically positioned for receiving the bridge of the nose snugly. A left plate 32 is secured to the left member 24 opposite of the elongated member 22 extending downwardly as best shown in FIG. 3 of the drawings. A right plate 34 is secured to the right member 26 opposite of the elongated member 22 extending downwardly as shown in FIG. 3 of the drawings.

4

As shown in FIGS. 1 through 4 of the drawings, the adjustable securing means 40 comprises an adjustable chin strap 42. A plurality of snap-buttons 48 are secured to the shield 20 and the adjustable chin strap 42 for allowing selective positioning of the chin strap to a frontal concentric position for various sizes of animals as best shown in FIGS. 1 and 4 of the drawings. At least one extended member 50 is secured to the rear end of the elongated member 22 extending parallel to the elongated member 22 and away from the first end a finite distance. A first neck strap 44 is secured to the extended member 50 opposite of the elongated member 22 for surrounding and engaging a lower portion of the animal's neck. A second neck strap 46 is secured to the rear end of the elongated member 22 for surrounding and engaging an upper portion of the animal's neck. At least one connecting strap 49 is secured mesial the first neck strap 44 and the second neck strap 46 as best shown in FIG. 2 of the drawings.

In use, after the animal's eyes are medically treated, there is a need to prevent irritation of the eyes because of the increased probability of infection. Therefor, the present invention is attached to the animal's head. The adjustable chin strap 42 is selectively secured to selected snap-buttons 48 depending upon the size of the animals head and neck. After the present invention is attached, the animal is unable to remove the present invention yet the animal is able to see clearly without obstruction. The animal is further preventing from accessing the eyes thereby preventing further irritation of the eyes which could lead to an injurious infection of the eyes. When the eyes of the animal have properly healed, the user simply removes the present invention from the animal's head and neck.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal eye protecting system comprising:
    a shield formed to cover a pair of eyes of an animal, said shield having;
        an elongated member having a front end and a rear end,
        a left member secured to a left edge of said elongated member adjacent said front end extending a finite distance towards said rear end, a right member secured to a right edge of said elongated member adjacent said front end extending a finite distance towards said rear end,
        wherein said left member and said right member slant downwardly from the elongated member and away from each other, an end member secured transversely to said first end of said elongated member and secured transversely to said left member and said right member for engaging a bridge of said animal's nose, and wherein said end member includes a cutout concentrically positioned for receiving said bridge of said nose, said cutout positioned substantially in a vertical plane;

a left plate secured to said left member opposite of said elongated member, said left plate extending downwardly from said left member;

a right plate secured to said right member opposite of said elongated member, said right plate extending downwardly from said right member;

a chin strap having an adjustable length, said chin strap removably coupled to said left plate at a first chin strap end and to said right plate at a second chin strap end; and an adjustable securing means attached to said shield for securing said shield to a head of said animal; said adjustable securing means comprising:

a plurality of coupling structures secured to said left and right plates for allowing selective positioning of said chin strap to comfortably fit on various sizes of animals;

at least one extended member secured to said rear end of said elongated member extending parallel to said elongated member and away from said first end a finite distance;

a neck strap secured to said extended member opposite of said elongated member for surrounding and engaging said animal's neck;

a head strap secured to said rear end of said elongated member for substantially vertically surrounding and engaging said animal's head; and at least one connecting strap secured between said neck strap and said head strap.

2. An animal eye protecting system comprising:

a shield formed to cover a pair of eyes of an animal, said shield having:

an elongated member having a front end and a rear end, a left member secured to a left edge of said elongated member adjacent said front end extending a finite distance towards said rear end, a right member secured to a right edge of said elongated member adjacent said front end extending a finite distance towards said rear end, wherein said left member and said right member slant downwardly from the elongated member and away from each other, an end member secured transversely to said first end of said elongated member and secured transversely to said left member and said right member for engaging a bridge of said animal's nose, and wherein said end member includes a cutout concentrically positioned for receiving said bridge of said nose, said cutout positioned substantially in a vertical plane, and an adjustable securing means attached to said shield for securing said shield to a head of said animal;

a left plate secured to said left member opposite of said elongated member, said left plate extending downwardly from said left member;

a right plate secured to said right member opposite of said elongated member, said right plate extending downwardly from said right member; and a chin strap having an adjustable length, said chin strap removably coupled to said left plate at a first chin strap end and to said right plate at a second chin strap end;

wherein said adjustable securing means comprises:

a plurality of snap-buttons secured to said left and right plates for allowing selective positioning of said chin strap to a frontal concentric position for various sizes of animals;

at least one extended member secured to said rear end of said elongated member extending parallel to said elongated member and away from said first end a finite distance;

a neck strap secured to said extended member opposite of said elongated member for surrounding and engaging said animal's neck;

a head strap secured to said rear end of said elongated member for substantially vertically surrounding and engaging said animal's head; and at least one connecting strap secured between said neck strap and said head strap.

3. The animal eye protecting system of claim 2, wherein said shield is comprised from a transparent plastic.

4. The animal eye protecting system of claim 2, wherein said shield is comprised from a tinted plastic for reducing the amount of light reaching said animal's eyes.

* * * * *